|   |   |   |
|---|---|---|
| United States Patent [19] | [11] | 3,990,906 |
| Johnston et al. | [45] | Nov. 9, 1976 |

[54] CLEANING TIRE MOLDS BY ULTRASONIC WAVE ENERGY

[75] Inventors: Robert H. Johnston, Cuyahoga Falls; Ralph O. Kline, Stow, both of Ohio

[73] Assignee: The Goodyear Tire & Rubber Company, Akron, Ohio

[22] Filed: Apr. 17, 1975

[21] Appl. No.: 568,873

[52] U.S. Cl. .................................. 134/1; 134/33; 134/149; 425/225; 425/DIG. 116
[51] Int. Cl.² ........................................... B08B 3/12
[58] Field of Search .................. 134/1, 23, 33, 147, 134/149, 169 R; 264/39; 425/225, 226, DIG. 116; 259/1 R

[56] References Cited
UNITED STATES PATENTS

| 2,468,550 | 4/1949 | Fruth .............................. 134/1 UX |
| 2,828,231 | 3/1958 | Henry ................................. 134/1 |
| 3,401,708 | 9/1968 | Henes ............................. 134/1 X |
| 3,482,584 | 12/1969 | Schipke ......................... 134/149 X |

FOREIGN PATENTS OR APPLICATIONS

| 929,998 | 6/1963 | United Kingdom .................... 134/1 |
| 702,381 | 1/1954 | United Kingdom .................... 134/1 |

*Primary Examiner*—S. Leon Bashore
*Assistant Examiner*—Richard V. Fisher
*Attorney, Agent, or Firm*—F. W. Brunner; R. S. Washburn

[57] ABSTRACT

Method and apparatus for cleaning a tire curing mold by immersion in liquid cleaning agent bath, wherein the complete upper assembly of the mold is immersed in the bath and slowly rotated. Super or ultrasonic energy sources are particularly located and aimed, so that in combination with the relative motion of the mold assembly relative to the sources no portion of the surfaces to be cleaned is hidden by any other part from the direct impingement thereon of the sound wave energy. Efficiency of mold cleaning is materially advanced.

8 Claims, No Drawings

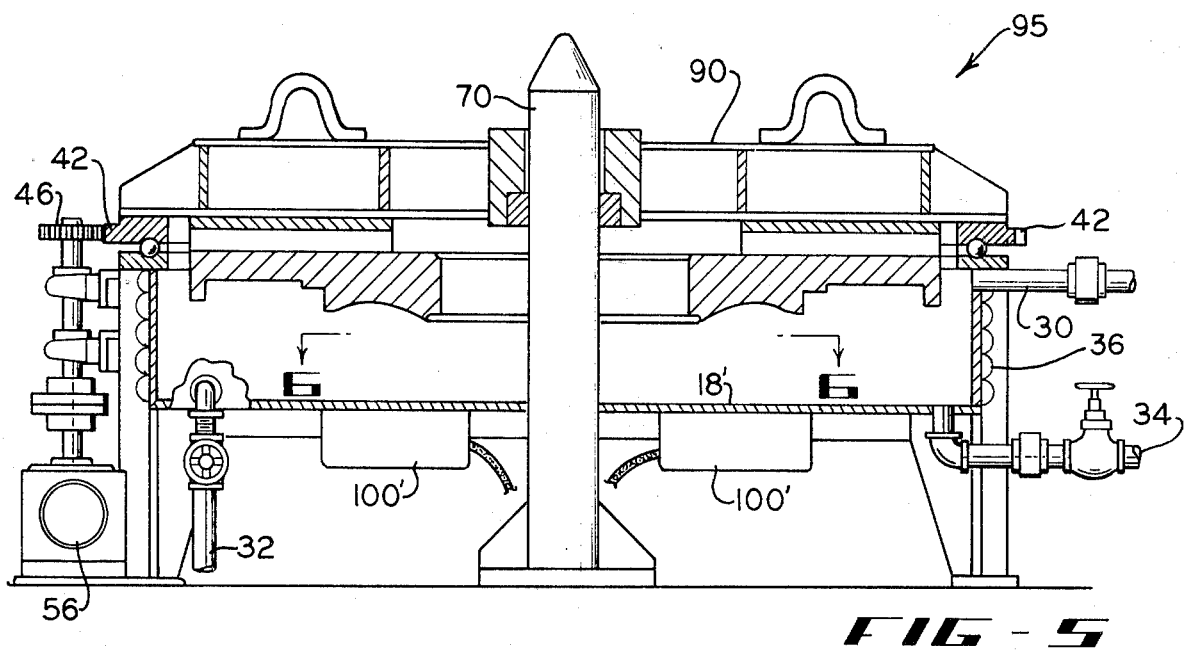
FIG-5
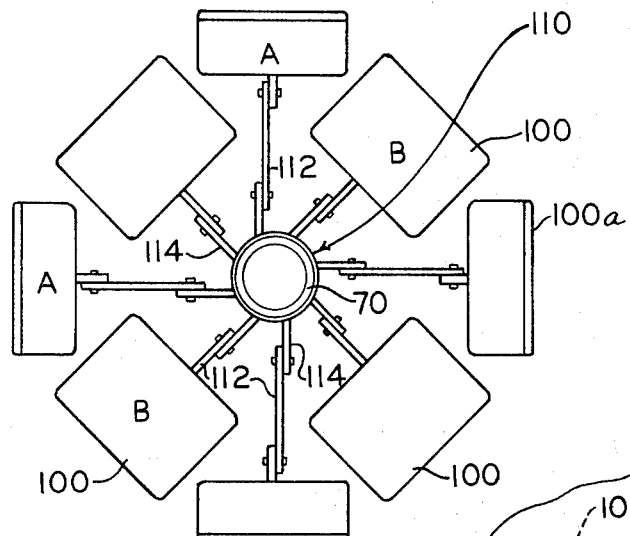
FIG-3
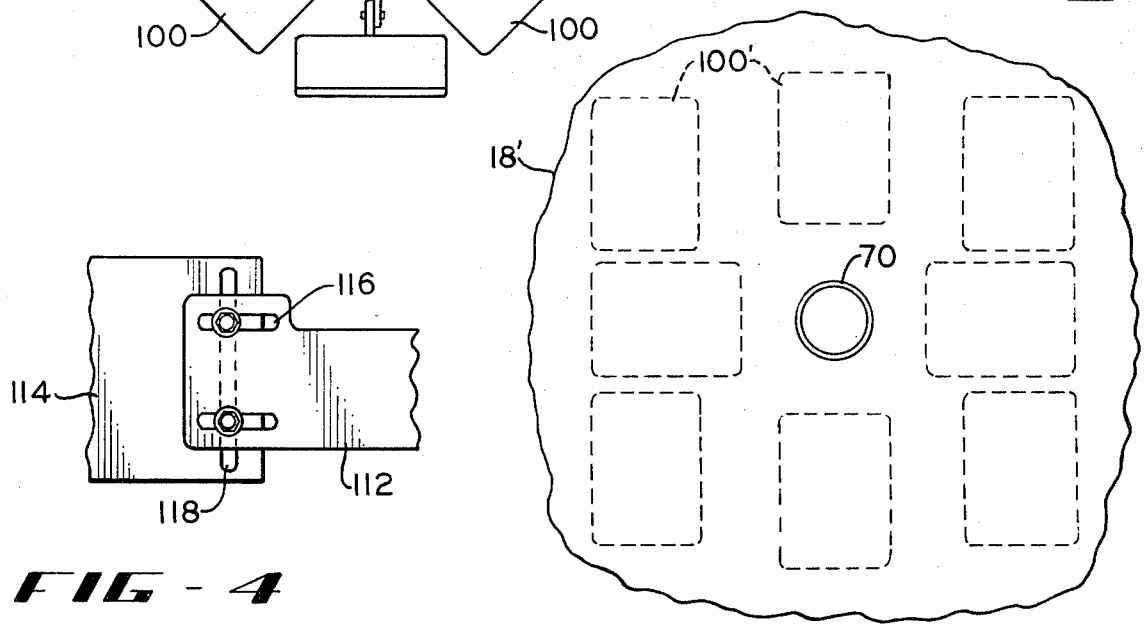
FIG-6
FIG-4 ial-3,990,906

CLEANING TIRE MOLDS BY ULTRASONIC WAVE ENERGY

This invention relates to cleaning tire molds, including the tire molds used for molding and curing pneumatic tires. The invention relates more specifically to a method and apparatus for cleaning tire molds, particularly of the segmented tread ring type, in a cleaning bath assisted by application of ultrasonic energy.

As is well known, tire curing molds during use accumulate an undesired coating on the molding surfaces which interferes with the satisfactory use of the mold. The coating must be removed at appropriate intervals. Moreover, it is very desirable that such coating be removed without in any way degrading the molding surfaces. Such molds are commonly made of iron or aluminum alloys and are provided with intricately contoured surfaces characterized by inward projections for forming the tire tread indentations and by valleys therebetween forming the projections of the tire tread. Heretofore, cleaning such tire molds has been difficult and expensive and occasionally has resulted in undesired reduction in the useful life of such mold because of impairment of the molding surfaces.

A principal object, therefore, of the present invention is the provision of an improved method and apparatus for cleaning tire molds. This object is attained in a method of cleaning tire molds, particularly tire molds of the segmented ring type wherein a mold part is immersed in a liquid bath having at least one ultrasonic wave energy emission means mounted to direct ultrasonic energy into said bath such that the liquid and the ultrasonic wave energy cooperate to clean the part, characterized by the improvement comprising suspending an assembly of a plurality of parts of the mold to be cleaned in the bath, rotating the assembly about an axis coincident with the axis of the assembly, and disposing a plurality of immersible means for emitting sound wave energy between the axis and the surfaces of the mold parts to be cleaned, said means each being aimed such that no part of the surfaces of the mold can lie between and thus shelter any other part of the surfaces from direct impingement thereon of the sound wave energy emitted by the nearest of the emission means.

In accordance with a further aspect of the invention, an apparatus for cleaning a tire mold is characterized by the improvement comprising a tank, containing the liquid bath, having a rotatable ring supported thereon, a lifting frame having fastening means for attaching an assembly of a plurality of mold parts thereto to be suspended in the bath, pilot means cooperating with the ring to register the lifting means for corotation about an axis common to the frame, the assembly, and the tank, while the lifting frame is supported on the ring, and drive means for rotating the ring while the lifting frame and the assembly supported thereby are rotated about the axis.

To acquaint those skilled in the art with the principles of the invention, the following detailed description of the best mode and preferred embodiments of the invention which includes and refers to the attached drawings wherein:

FIGS. 3 and 4 are enlarged views of a portion of the apparatus of FIG. 1;

FIG. 5 is an elevation, in cross-section of a modification of the apparatus of FIG. 1; and FIG. 6 is a view of the apparatus of FIG. 5 taken as indicated by the line 6—6.

Figure 1:
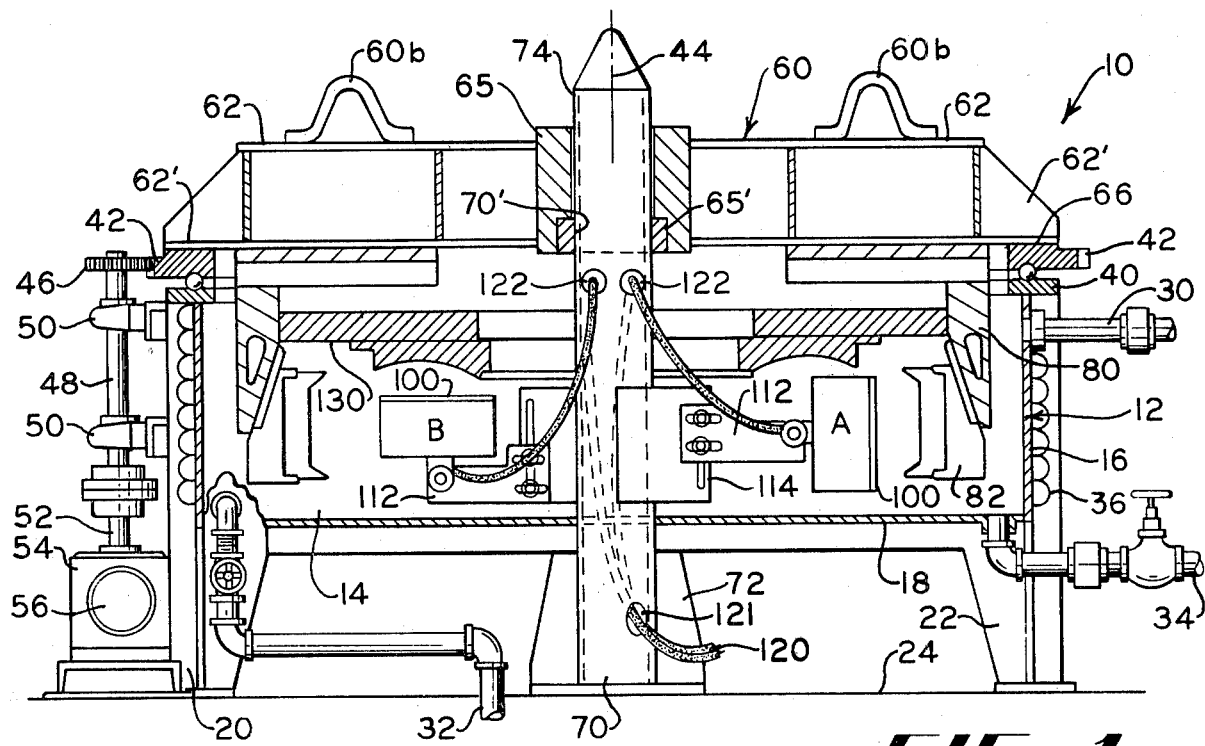
FIG. 1 is an elevation in cross-section of apparatus according to the invention.
Figure 2:
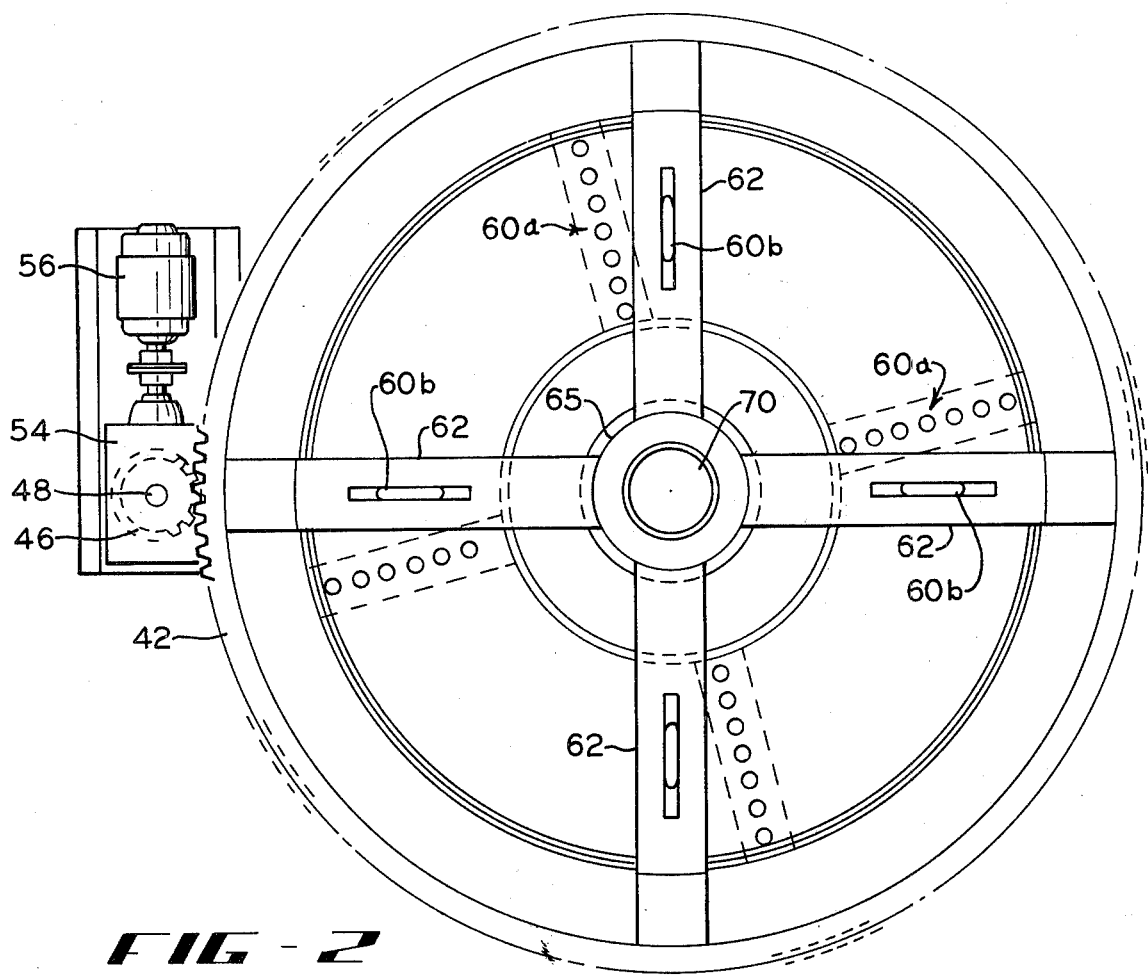
FIG. 2 is a plan view of the apparatus of FIG. 1.

In the practice of the invention, the liquid bath in which the mold parts are immersed for cleaning is a commercially available liquid cleaning mixture free of abrasive particulate material and compounded for compatibility with the materials of which the mold is made. A satisfactory mixture is provided by Fremont Industries, Inc., Shakopee, Minn., 55379. This mixture includes Fremont 7102, a cleaner which is said to be a non-ferrous alkaline cleaner comprising mild alkalies, silicates, and bio-degradable emulsifiers and surfactants, and having a pH of 11–12; and Fremont 7103, an accelerator comprising water-soluble solvents, and a combination of bio-degradable surfactant inhibitors and emulsifiers. Equal parts by weight of the cleaner and the accelerator are mixed with water at 1½ pounds per gallon (0.18 kilograms per liter). The liquid mixture is free of cyanides, chromates, or phenols.

Following the cleaning of a tire mold assembly, as set forth herein, the assembly is subjected to conventional rinsing by clear water spray.

The bath is heated to a temperature of from 140° to 200° F. and preferably from about 160° to 190° F. Normally, temperature controls will be set for 180° F. For best efficiency, it is desirable that the bath be quiescent and free from included air in the form of froth or bubbles.

Rather than disassemble a mold as has commonly been required in the prior art practice, we attach to the actuating ring of the mold a lifting frame by which the entire upper part of the mold including a mold sidewall plate and the several segments forming the tread ring can be lifted off the lower sidewall plate of the mold as a complete assembly. The lower sidewall plate is then inverted and is itself attached to a lifting frame as will be described presently.

The lifting frame and the assembly of mold parts is then carried by crane and lowered into the bath so that all of the surfaces to be cleaned are immersed below the liquid level.

In accordance with the invention, we provide for relative movement between the tire mold surfaces to be cleaned and the emission means of the ultrasonic wave energy by supporting the radially outward extremities of the lifting frame on a ring which is mounted for rotation about the axis of the tank and of the mold on a flange provided on the periphery of the wall of the tank retaining the bath. By means of a pinion engaging a gear carried by the ring, the lifting frame and the mold assembly are caused to rotate slowly relative to the supersonic wave energy emission means. The relative motion is slow, preferably less than about one foot per minute and in any case sufficiently low speed so that no aeration of the liquid bath can occur.

The previously referred to projections forming portions of the mold surface have sides some of which at least are oriented not only radially inwardly toward the mold axis but also oriented convergently toward the mid-cicumferential plane of the mold. We have found, contrary to the teachings of the prior art, that the supersonic energy emitted from sources thereof is less than satisfactorily effective in cleaning any portion of the mold surface if such portion is in any way shadowed or sheltered from the direct impingement thereon of the wave energy. In accordance with the invention, therefore, we locate and aim each energy emission means such that the pattern of wave energy emission therefrom is directed toward the surfaces to be cleaned in such a manner that no portion of the surface, particularly projections thereof, can shelter or shadow any other part of such surface from the direct emissions of wave energy from such means. This is contrary to the belief common in the prior art. For example, one manufacturer of ultrasonic generators and transducers states in its advertising, "dispersion of power throughout the tank is achieved on limited frequency sweep which provides a high degree of dispersion of sonic activity into the tank, therefore, no dead spots." In other words, prior to this invention, it was believed that the ultrasonic energy could reach around corners and be effective throughout the space in which it was applied. On the contrary, we have found that at least with tire mold cleaning this common belief is not true and it is essential that the supersonic waves emitted from the emission means impinge directly on the surface to be cleaned.

To facilitate the practice of the method above described, there is provided in accordance with the invention also an apparatus 10 as illustrated in the drawings. In FIG. 1, a vertical cross-section of the apparatus, there is shown a tank 12 for containing an appropriate liquid bath 14 in which mold parts to be cleaned can be immersed. The tank is cylindrical having vertical walls 16 and a flat horizontal floor 18. It can be provided of any suitable materials and type of construction. In the present embodiment the cylindrical walls and floor are of common tank steel suitably reinforced externally with structural rolled section bars 20. Certain of the structural bars are extended downward to form the legs 22 which elevate the floor 18 of the tank above the operating floor 24 to provide access for piping and service. The tank is provided also with conventional piping including an overflow 30 and inlet 32 and outlet 34 connections communicating with a recirculating tank and pump (not shown). The steam jacket 36 provides means for heating the liquid in the tank. As thus far described, the tank is entirely conventional.

In accordance with the invention, on the upper circumferential rim of the tank there is provided a top flange 40 having a suitable bearing on which is disposed a ring gear 42 the inside diameter of which about equals the tank diameter and which can be rotated about the vertical central axis 44 relative to the top flange. The ring gear is in driving mesh with a pinion 46 fixed on a vertical shaft 48 supported by a spaced pair of pillow blocks 50 mounted on the external sidewall of the tank and particularly on a pair of the structural members 20 forming one of the tank legs. The shaft 48 is coupled conventionally to the vertical output shaft 52 of a gear reducer 54, the input shaft of which is coupled to a conventional electric motor 56. Upon being energized, the motor drives the ring gear in rotation at a peripheral rate of about one foot per minute.

A lifting frame 60 comprising four radially extending beams 62 integrally attached to a central hub 65 is disposed above the ring gear with the radially outward extremities 62' of the respective beams bearing on the upper surface 66 of the ring gear 42 such that the lifting frame 60 is rotated by and with the ring gear when the motor 56 is energized.

A central upright post 70 of hollow tubular section is built integrally into the tank 12, extending along its vertical central axis 44 and through the floor 18 of the tank to form an additional and central leg 72 for the support of the tank floor. At its upper end 74, extending to an elevation higher than the top of the tank, the central post has a coned cap which serves as a pilot means to assist an operator to guide the lifting frame 60 downward into position as illustrated in FIG. 1. The hub 65 of the lifting frame is bored centrally of the hub to receive a sleeve bearing 65' which cooperates with a journal portion 70' of the post to insure that the frame 60 and its load are guided for rotation about the vertical axis 44 of the tank.

The lifting frame 60 is equipped with means for attaching an assembly of mold parts to be cleaned and in particular provides an array of bolt holes 60a situated therein in accordance with corresponding tapped holes provided in each of the molds to be cleaned in the apparatus. In the cleaning of the assembled mold parts in which the tread ring is of the segmented type it is preferred to attach the actuator ring 80 to the lifting frame 60. The actuator ring is that circumferentially continuous ring having an internal coned surface the sides of which converge upwardly toward the axis of the mold and which coned surface cooperates with correspondingly coned surfaces on each of the segments 82 of the tread ring. The arrangement is a well-known device operable for moving tread ring segments radially inwardly toward a closed position and radially outwardly toward an open position in the usual manner. This manner of attachment of the assembled mold parts to the lifting frame 60 also serves conveniently to maintain the individual segments spaced apart (by gravity) while they are immersed in the bath for cleaning. The lifting frame is also provided with a pair of spaced grab eyes 60b to which conventional sling hooks and hoist can be connected in order to lift the frame and the assembled mold parts into and out of the bath.

The arrangement so far described provides effectively for a slow rotation of the mold parts in the bath and avoids the heretofore necessity of disassembling the mold completely in order satisfactorily to clean each of the component parts.

The slow rotation at a rate of less than one foot per minute measured at the maximum diameter of the mold surface to be cleaned provides rotation less than sufficient to agitate the liquid of the bath so that the bath remains quiescent during such rotation.

The previously mentioned lower sidewall plate, after being inverted, is similarly attached to a second lifting frame 90, similar or identical to the frame 60. In FIG. 5, the apparatus 95 there illustrated is like the apparatus 10 depicted in FIG. 1 in all respects except that the bath is more shallow and the supersonic wave energy emission means are mounted, in accordance with the invention, differently from those of FIG. 1, as presently will be described.

In order to augment the cleaning efficiency of the supersonic wave energy applied in cooperation with the liquid of the bath, a plurality of supersonic wave energy emission means 100 are fully immersed in the bath and are located in a particular manner relative to the surfaces to be cleaned of the several mold parts in assembly. We have found that in order to obtain good cleaning of such surfaces and to reduce the time required for cleaning as compared to heretofore available cleaning methods, it is necessary that each of the supersonic wave energy emission means 100 be located and directed toward such surfaces so that no portion of any of the surfaces to be cleaned overlies, or shadows or shelters or hides any other portion of such surface from the direct impingement thereon of the supersonic wave energy. We have found that, contrary to the advice of experts in the field of supersonic cleaning, in cleaning tire molds, relative movement between the mold surface and the source of supersonic wave energy improves cleaning efficiency over cleaning without such relative movement and, secondly, that disposing the supersonic wave energy means 100 so that its energy flux is directly incident on all parts of the surface to be cleaned, insuring that no part of such surface overlies or shadows or shelters any other part of such surface, further improves the efficiency and economy of cleaning over heretofore available arrangements without such disposition of the wave energy emission means. The two stated measures are each independently effective and when combined yield even further improvement.

To effect the particular advantages mentioned, in the apparatus 10, we provide a multi-armed fixture or spider 110 fixed symmetrically on the center post 70 at such elevation with respect to the disposition of the mold parts in the tank that the means 100 can be aimed in the way described herein. In the embodiment described, the multiple means 100 are each 500-watt magnetostrictive solid state sound transducers obtained from the Tronic Corporation, 501 Bragato Rd., Belmont, Cal. 94002.

These transducers are provided with a conventional mounting bracket 112 best seen in FIG. 3. Each arm of the spider carries an adaptor plate 114 suitably drilled for rigid connection to the mounting bracket 112 of the respective source and slotted as at 116 to be adjustably connected to the bolt slot 118 in each of the respectively associated arms of the spider such that the orientation of the wave flux can be either horizontal as illustrated at A, or vertical as illustrated at B, or angularly relative thereto. The pattern of bolt slots in each arm is such as to allow for vertical adjustment of the position of the respective source. We have also found that the distance from the face 100a of the means 100 to the surface to be cleaned should not be more than about 24 inches (60 cm) nor less than about 12 inches (30 cm) in the apparatus 10.

We have found that the foregoing adjustments, once made, need not ordinarily be changed during a cleaning of a series of tire molds of similar type and size. When it becomes necessary to readjust the positions of the respective sources, they can be adjusted to a position represented by a simple sheet metal template, the parameters of which can readily be determined by reference to the particular mold series to be cleaned.

The hollow, central post 70 provides an additional advantage in that power lead cables 120 for each of the supersonic wave energy means 100 can be disposed inside the post, entering an opening 121 in the wall of the tube below the floor of the tank, exiting from the tube through an opening 122 above the liquid level 130 of the bath and extending therefrom to the individual means 100.

In cleaning the aforesaid lower sidewall mold part, the apparatus 95 has an array of supersonic wave energy emission means 100' fixed on the tank floor 18'. The emission means 100' used are identical to the emission means 100, except for immersibility. Since, with the relatively less intricate patterns of the surface to be cleaned of the sidewall, as compared to the tread ring surfaces, the means 100' can be affixed externally to the floor of the tank, so long as each is located and aimed to project the wave energy therefrom directly on the surface to be cleaned, without any part thereof being sheltered by any other part of the surface. The shallower bath and commensurately shallower tank ensures that the desired distance between the surface to be cleaned and the emitting surface of the means 100' can be between 12 and 24 inches (30–60 centimeters).

The invention yields numerous advantages over prior methods and apparatus for cleaning tire molds particularly of the segmented tread ring type. In the best known prior operations, from 19 to 24 hours were required to clean a mold including the necessary disassembly and reassembly, whereas according to the present invention, two hours is sufficient to thoroughly clean a mold without disassembly of it. Since the assembly and disassembly of the mold involve the risk of damage to its critical edges and surfaces, the operation according to the present invention eliminates such risk. Moreover, we have found that cleaning in accordance with the present invention does not in any way degrade the surfaces of the mold, whereas in the prior methods there was an inevitable degradation of the mold surfaces due to the abrasives necessarily used to achieve a satisfactory degree of cleaning. In the heretofore used cleaning operations some parts of the surfaces to be cleaned were not reached and required therefore manual cleaning which, because of its cost, was undesirable.

Surprisingly, in addition, we have discovered that by cleaning a mold according to the present invention, certain mold release substances commonly used are not removed. For example, Teflon (registered trademark) coatings amd molybdenum disulfide lubricants furnished under the registered trademark "Never Sieze," are not removed even through the undesirable residues accumulated in the production curing of tires are thoroughly softened and readily removed. These release agents and lubricants are not removed and the usual requirement of relubricating the tire mold before its reuse is reduced or eliminated.

While certain representative embodiments and details have been shown for the purpose of illustrating the invention, it will be apparent to those skilled in the art that various changes and modifications may be made therein without departing from the spirit or scope of the invention.

What is claimed is:

1. In a method of cleaning tire molds, particularly tire molds of the segmented tread ring type, by immersing at least one mold part having a surface to be cleaned in a liquid bath having at least one ultrasonic wave energy emission means mounted to direct ultrasonic energy into said bath whereby the liquid and the ultrasonic wave energy cooperate to clean said part, the improvement comprising suspending an assembly of a plurality of parts of said mold to be cleaned in said bath, rotating said assembly as an entity about a vertical axis coincident with the axis of said assembly, and disposing a plurality of emission means for emission of sound wave energy between said axis and the surface to be cleaned of said mold parts such that no part of any said surface can lie between and thus shelter any other part of said surface from sound wave energy emitted by the nearest of said emission means.

2. A method as claimed in claim 1, wherein the liquid of said bath comprises a solvent free of abrasive material.

3. A method as claimed in claim 2, wherein said solvent comprises a liquid mixture of (a) a non-ferrous alkaline cleaner comprising mild alkalies, silicates, and bio-degradable emulsifiers and surfactants, and having a pH of 11–12; (b) an accelerator comprising water soluble solvents, bio-degradable surfactant inhibitors and emulsifiers; and (c) water, said liquid mixture being free of cyanides, chromates and phenols.

4. A method as claimed in claim 1, wherein said rotating step provides rotation less than sufficient to agitate the liquid of said bath whereby the bath remains quiescent during such rotation.

5. A method as claimed in claim 1, wherein said rotating step comprises rotation at a rate of less than one foot per minute measured at the maximum diameter of the mold surface to be cleaned.

6. A method as claimed in claim 1, wherein the liquid of said bath is heated to a temperature of between 140° F. and 200° F.

7. In apparatus for cleaning a tire mold, particularly of the segmented tread ring type having a surface to be cleaned, by immersing at least one part of said mold in a liquid bath and by subjecting said at least one part to ultrasonic wave energy from emission means providing a source thereof mounted to direct energy into said bath whereby the liquid and the ultrasonic wave energy from said means cooperate to clean said part, the improvement comprising a tank containing said bath and having a rotatable ring supported thereon about the perimeter of the bath, a lifting frame having fastening means for attaching an assembly of a plurality of mold parts thereto to be suspended in said bath, pilot means cooperating with said ring to register said lifting means for corotation about a vertical axis of the frame while said frame is supported on said ring, and drive means for rotating said ring while the lifting frame and said assembly supported thereby are rotated about said vertical axis.

8. Apparatus as claimed in claim 7, further comprising a fixture disposed in said tank and mounting said at least one emission means adjustably to position and to aim said emission means such that energy therefrom can impinge directly on the surface to be cleaned and that no part of said surface shadows or shelters any other part thereof.

* * * * *